(12) United States Patent
Macartney et al.

(10) Patent No.: US 8,272,998 B2
(45) Date of Patent: Sep. 25, 2012

(54) MULTI-FUNCTIONAL TREADMILL SYSTEM

(75) Inventors: Marian Macartney, South Easton, MA (US); Peter Previte, Chepachet, RI (US)

(73) Assignee: Trailblazers Aquatic LLC, A Massachusetts limited liability co., South Easton, MA (US)

( * ) Notice: Subject to any disclaimer, the term of this patent is extended or adjusted under 35 U.S.C. 154(b) by 0 days.

(21) Appl. No.: 12/902,959

(22) Filed: Oct. 12, 2010

(65) Prior Publication Data

US 2011/0086745 A1    Apr. 14, 2011

Related U.S. Application Data

(60) Provisional application No. 61/250,192, filed on Oct. 9, 2009.

(51) Int. Cl.
    *A63B 21/00* (2006.01)
(52) U.S. Cl. .................. 482/54; 482/111; 119/700.2
(58) Field of Classification Search ............ 482/54, 482/111; 119/700.2, 700.4
    See application file for complete search history.

(56) References Cited

U.S. PATENT DOCUMENTS

| | | | |
|---|---|---|---|
| 3,835,815 A | 9/1974 | Matthews | |
| 4,236,489 A | 12/1980 | Carra | |
| 4,576,376 A | 3/1986 | Miller | |
| 4,712,788 A * | 12/1987 | Gaudreau, Jr. | 482/54 |
| 4,776,581 A * | 10/1988 | Shepherdson | 482/27 |
| 4,918,766 A | 4/1990 | Leonaggeo, Jr. | |
| 4,938,469 A | 7/1990 | Crandell | |
| 5,002,015 A | 3/1991 | Sampson et al. | |
| 5,108,088 A * | 4/1992 | Keller et al. | 482/5 |
| 5,114,390 A | 5/1992 | Tribelhorn, Jr. | |
| 5,123,641 A | 6/1992 | Abboudi et al. | |
| 5,295,929 A * | 3/1994 | Weisz | 482/54 |
| 5,316,532 A | 5/1994 | Butler | |
| 5,378,213 A | 1/1995 | Quint | |
| 5,487,713 A * | 1/1996 | Butler | 482/111 |
| D370,508 S | 6/1996 | Drennan | |
| 5,558,604 A * | 9/1996 | Hopkins | 482/54 |
| 5,586,961 A | 12/1996 | Quint | |
| 5,647,826 A | 7/1997 | Butler | |
| 5,921,892 A | 7/1999 | Easton | |
| 5,951,447 A * | 9/1999 | Butler | 482/111 |
| D424,139 S | 5/2000 | Gwin | |
| 6,273,844 B1 | 8/2001 | Kelsey et al. | |

(Continued)

FOREIGN PATENT DOCUMENTS

JP    1057519    3/1998

(Continued)

*Primary Examiner* — Jerome W Donnelly
(74) *Attorney, Agent, or Firm* — Barlow, Josephs & Holmes, Ltd.

(57) ABSTRACT

The present invention includes a treadmill system including a support platform, a liquid tank, and a lift support structure connected to a treadmill assembly by a lifting mechanism. In general, the liquid tank and the lift, support structure including the treadmill assembly move horizontally relative to and independent of one another along the support platform to position the lift support structure away from or about the liquid tank. In addition, the treadmill assembly moves vertically relative to and independent of the lift support structure using the lifting mechanism to lower or raise the treadmill assembly within an interior of the liquid tank or exterior of the liquid tank. More importantly, the combination of the horizontal movement and the vertical movement of the treadmill assembly permits a mammal to step onto the treadmill assembly before the treadmill assembly is raised and then lowered into an interior of the liquid tank.

15 Claims, 14 Drawing Sheets

U.S. PATENT DOCUMENTS

| | | | |
|---|---|---|---|
| D484,554 S | 12/2003 | Hellman, Jr. et al. | |
| 6,857,990 B1 | 2/2005 | Silva | |
| 7,044,086 B2 | 5/2006 | Fisher | |
| 7,241,250 B1 * | 7/2007 | French et al. | 482/54 |
| 7,536,977 B1 * | 5/2009 | Williams | 119/700 |
| 8,069,821 B1 * | 12/2011 | Green | 119/671 |
| 8,074,304 B1 * | 12/2011 | Snyder | 4/541.1 |
| 2003/0130095 A1 | 7/2003 | Hellman et al. | |
| 2004/0163609 A1 * | 8/2004 | Jeffery | 119/673 |
| 2004/0194734 A1 | 10/2004 | Fisher | |
| 2006/0243217 A1 | 11/2006 | Patterson | |
| 2007/0054780 A1 | 3/2007 | Trevino et al. | |
| 2007/0079766 A1 | 4/2007 | Park | |
| 2007/0184947 A1 | 8/2007 | Hruska, Jr. | |
| 2008/0271236 A1 | 11/2008 | Truman | |

FOREIGN PATENT DOCUMENTS

| | | |
|---|---|---|
| JP | 2006288947 A | 10/2006 |
| JP | 2009178063 A | 8/2009 |

* cited by examiner

MULTI-FUNCTIONAL TREADMILL SYSTEM

CROSS REFERENCE TO RELATED APPLICATION

This application is related to and claims priority from earlier filed provisional patent application Ser. No. 61/250,192, filed Oct. 9, 2009 and incorporated herein by reference.

BACKGROUND OF THE INVENTION

The present relates generally to treadmill systems, and more particularly to a treadmill system for mammals, such as canines. The treadmill system provides a multi-functional and upgradable treadmill system having modularity, ease-of-use, ease of cleaning and maintenance, hot-swapping of parts at time of repair, and the ability to upgrade to a full hydrotherapy treatment system (combination of treadmill and lap pool). In addition, the multi-functional treadmill system provides the flexibility of providing physical therapy simultaneously to more than one mammal at a time. Also, the multi-functional treadmill system reduces the expense, effort, and space required to maintain and operate a treadmill system for therapy in water and outside of the water.

Treadmill systems are currently available in veterinary facilities and canine rehabilitation centers throughout the world. Veterinary educators and veterinarians in the mainstream have come to appreciate the need for physical therapy for their postoperative patients and their patients with progressive orthopedic and neurological conditions.

Pet owners now view their animals as members of the family, and have come to expect the same high quality food, services, and health care. Pet owners also purchase pet health insurance in increasing numbers to cover services that they otherwise might not be able to afford. This often includes surgeries to correct health ailments as well as veterinary rehabilitation services. Many pet owners seek out veterinary rehabilitation on their own initiative and then request a referral from their veterinarian. Most veterinarians now recognize the importance of veterinary rehabilitation to significantly increase the success rate of veterinary surgeries. Owners are also seeking rehabilitation for their pets which have developed neurological or other progressive conditions where surgery is not an option in order to increase their pet's useful life. Pets are now living longer and consequently their quality of life is becoming increasingly important to their families.

Veterinary rehabilitation is still a relatively new area of veterinary medicine. Underwater treadmill therapy has benefited human patients for almost two decades. This therapy has quickly gained acceptance for canine patients since its first use in 1998. Underwater treadmill systems are now available in veterinarian's offices, veterinary hospitals, and veterinary rehabilitation facilities throughout the world. In these facilities, underwater treadmill systems have become the rehabilitation equipment of choice, and sooner or later, is a major purchase of every canine rehabilitation center and veterinary college program.

A number of underwater treadmill systems are on the market today, for humans as well as for dogs. A minimum specification for an underwater treadmill system would include a tank with sufficient glass to allow viewing of the patient's legs, and which holds water that has been heated to a specific temperature. A motorized treadmill sits inside the tank. The system usually includes filtering equipment. The patient is directed into the tank where the therapist(s) administer treatment.

Many of the systems currently on the market share, a similar design; they utilize a "walk-in" exercise tank. These tanks are certainly easy for entry and exit of the dog, but obviously require that the tank be empty before the tank door can be opened. As a result, water must be pumped in after the dog enters the tank and the tank door is closed behind him. Similarly on exit of the dog, water must be pumped out completely before the tank door can be opened. These systems are metal (usually stainless steel) and have one or two tank doors which have adequate seals to prevent water leakage. Once the dog is inside the tank, the door is closed and water is pumped in from a secondary liquid tank into the treatment tank to the optimal level for the aquatic treatment. When the treatment is completed, the water is pumped out of the tank and back into the secondary liquid tank. Some water filtration and hair removal are performed in conjunction with the pumping of water. Note that this walk-in design is also present in human underwater treadmill systems as well as in "premier" accessible bathtubs for the elderly and disabled, although the accessible baths do not utilize a secondary liquid tank.

There are several disadvantages of the walk-in design. It contains water pipes, pumps, and a secondary liquid tank capable of holding 300 to 500 gallons of water. This adds cost to the system and increases the overall footprint. It also adds an eight to twelve minute delay to every patient treatment, where treatment times typically range from 20 to 30 minutes long. This translates directly to a lower rate of return on investment. And, from the therapist's perspective, when he or she has to assist a small dog's legs during therapy, the ergonomics are very poor.

Another significant concern to owners of underwater treadmill systems is the ease of cleaning and maintenance. Walk-in tanks have the treadmill located at the bottom of the tank. With the earliest walk-in systems on the market, cleaning the treadmill as well as the bottom of the tank was extremely difficult, requiring a winch located above the tank to lift and position the treadmill on an angle while it still remained inside the tank. As a result, the ergonomics of cleaning the treadmill and tank bottom were very poor. More recent models of the walk-in tanks provide mechanisms to tilt the treadmill more readily while still inside the tank, but the ergonomics of cleaning and maintenance are still poor. These systems by their nature are prone to collect dog hair, dog treats, dirt, and other undesirable materials. Failure to clean and maintain these systems frequently and thoroughly will lead to early system breakdown.

Owners of existing underwater treadmill systems report that support calls and repairs vary depending on vendor and the age of the unit. For example, some of the systems have hydraulically driven treadmills with out-of-water motors which can be problematic. Because these systems are tightly bundled, troubleshooting and repairs usually require site visits by a technician in addition to waiting for delivery of parts. The down-time involved is significant. Owners report that it is not unusual to have days to weeks of down-time.

The prior art treadmill systems suffer from a couple of disadvantages. Specifically, the prior art does not allow for a treadmill system which is multi-functional and upgradable. In addition, the prior art does not allow for a treadmill system Which provides the flexibility of providing physical therapy simultaneously to more than one mammal at a time. Also, the treadmill systems of the prior art are not modular which increases the expense, effort, and space required to maintain and operate a treadmill system for therapy in water and outside of the water. Further, the prior art does not disclose a treadmill system which is upgradable to a complete hydrotherapy treatment system.

BRIEF SUMMARY OF THE INVENTION

The present invention preserves the advantages of prior art multi-functional treadmill systems. In addition, it provides new advantages not found in currently available multi-functional treadmill systems and overcomes many disadvantages of such currently available multi-functional treadmill systems.

The present invention provides a multi-functional and upgradable multi-functional treadmill system having modularity, ease-of-use, ease of cleaning and maintenance, hot-swapping of parts at time of repair, and the ability to upgrade to a full hydrotherapy treatment system (combination of treadmill and lap pool). In addition, the multi-functional treadmill system provides the flexibility of providing physical therapy simultaneously to more than one mammal at a time. Also, the multi-functional treadmill system reduces the expense, effort, and space required to maintain and operate a treadmill system for therapy in water and outside of the water.

The present invention includes a treadmill system including a support platform, a liquid tank, and a lift support structure connected to a treadmill assembly by a lifting mechanism. In general, the liquid tank and the lift support structure including the treadmill assembly move horizontally relative to and independent of one another along the support platform to position the lift support structure away from or about the liquid tank. In addition, the treadmill assembly moves vertically relative to and independent of the lift support structure using the lifting mechanism to lower or raise the treadmill assembly within an interior of the liquid tank or exterior of the liquid tank. More importantly, the combination of the horizontal movement and the vertical movement of the treadmill assembly permits a mammal to step onto the treadmill assembly before the treadmill assembly is raised and then lowered into an interior of the liquid tank.

The multi-functional treadmill system includes a support platform having at least two side rail members positioned along a horizontal axis. A liquid tank positioned within an interior defined by the support platform. The liquid tank positioned on six high density plastic feet which rest on a floor within the interior. In one embodiment, the liquid tank includes apertures which are temporarily plugged along a side wall of the liquid tank.

A lift support structure having a sliding mechanism attached at a lower portion of the lift support structure and configured for slidable engagement with said at least two side rail members for independent movement of the lift support structure along a horizontal axis relative to the liquid tank.

The treadmill assembly operationally connected to a lifting mechanism to provide vertical raising and lowering of the treadmill assembly by the lifting mechanism attached to the lift support structure for positioning the treadmill assembly within the liquid tank independent of the lift support structure.

The treadmill assembly includes a base, a conveyor belt connected to the base, and a roller assembly connected to the conveyor belt.

The lifting mechanism includes at least one winching assembly including at least one winching wheel, a motor connected to the at least one winching assembly using a drive shaft, a series of gear boxes connected to the motor, winching assembly, and the drive shaft, and a wire member connecting the at least one winching wheel of the winching assembly to the base of the treadmill assembly.

At least one pull handle attached to an upper portion of the life support structure to facilitate horizontal movement of the lift support structure along the support platform relative to the liquid tank.

A guard extends about a periphery of a base of the treadmill assembly and attached to an upper surface of the treadmill assembly to contain mammal or user of treadmill during operation. The guard includes a series of slidably moving doors with handles which can be easily removed or attached to the treadmill assembly. A door member is hingedly connected to the treadmill assembly for engagement with open end of the guard to permit mammal or user to engage treadmill assembly.

The treadmill assembly operationally connected to a pulley assembly for driving a conveyor belt of the treadmill assembly. The pulley assembly including a housing, a pulley motor to provide power, and a series of belts connected to the pulley motor and a roller assembly of the treadmill assembly for driving the conveyor belt. The pulley motor of the pulley assembly positioned upwardly from and attached to a base of the treadmill assembly and extending to a height approximately greater than the height of the liquid tank. The extended height of the pulley motor relative to the treadmill assembly prevents the pulley motor from being inserted into interior of the liquid tank.

In an alternative embodiment, a control center including a CPU is operationally connected to the lifting mechanism for vertical control of the treadmill assembly, means for cleaning water of the liquid tank, the treadmill assembly, and a means for moving the lift support structure along a horizontal axis independent of the liquid tank.

To provide stability to the treadmill assembly, at least one stabilizer bar assembly and at least one spring-biased member is provided. The at least one stabilizer bar assembly is attached to a housing of the pulley assembly and to the treadmill assembly to provide stability during movement. The at least one spring-biased member is attached to the base of the treadmill assembly for engaging the treadmill assembly and the liquid tank to stabilize the treadmill assembly during movement within the liquid tank.

In operation, the lifting mechanism raises the treadmill assembly above the liquid tank, the lift support structure moves horizontally independent of and relative to the liquid tank along the support platform for positioning about the liquid tank, and the lifting mechanism lowers the treadmill assembly into an interior of the liquid tank independent of and relative to the lift support structure.

In addition, the present invention provides a method for operating a multi-functional treadmill system comprising the following steps. First, a support platform is provided. Second, a liquid tank is positioned within an interior defined by the support platform. Third, a treadmill assembly is attached to a lift support structure near the support platform to allow the mammal or user to engage the treadmill assembly. Fourth, the treadmill assembly is raised away from the support platform towards a top portion of the lift support structure. Fifth, the lift support structure slides along a horizontal axis independent of the liquid tank while engaging the support platform to position the treadmill assembly above the liquid tank. Finally, the treadmill assembly is lowered independent of the lift support structure along a vertical axis to a position within an interior of the liquid tank.

It is therefore an object of the present invention to provide a multi-functional treadmill system which has independent vertical and horizontal movement of the treadmill assembly.

It is a further object of present invention to provide multi-functional treadmill system having modularity for ease of use, cleaning, repairs and maintenance.

Another object of the present invention is to provide multi-functional treadmill system which provides the flexibility of providing physical therapy simultaneously to more than one mammal at a time.

A further object of the present invention is to provide a multi-functional treadmill system that reduces the expense, effort, and space required to maintain and operate a treadmill system for therapy in water and outside of the water.

Other objects, features and advantages of the invention shall become apparent as the description thereof proceeds when considered in connection with the accompanying illustrative drawings.

BRIEF DESCRIPTION OF THE DRAWINGS

The novel features which are characteristic of the multi-functional treadmill system are set forth in the appended claims. However, the multi-functional treadmill system, together with further embodiments and attendant advantages, will be best understood by reference to the following detailed description taken in connection with the accompanying drawings in which:

DETAILED DESCRIPTION OF PREFERRED EMBODIMENT

Figure 1:
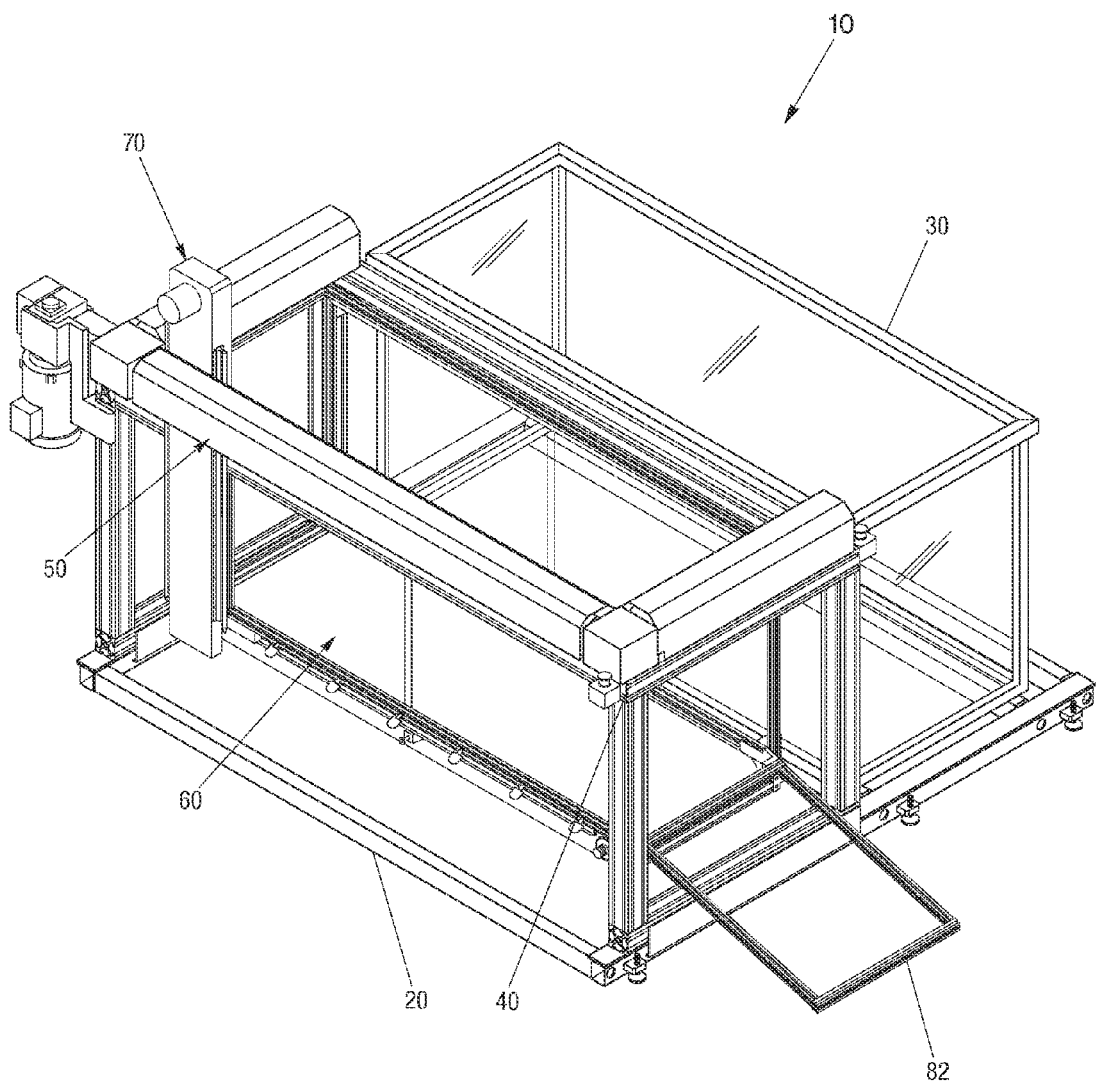
FIG. 1 is a left perspective view of the multi-functional treadmill system of the present invention with the treadmill assembly in a fully lowered position.
Figure 2:
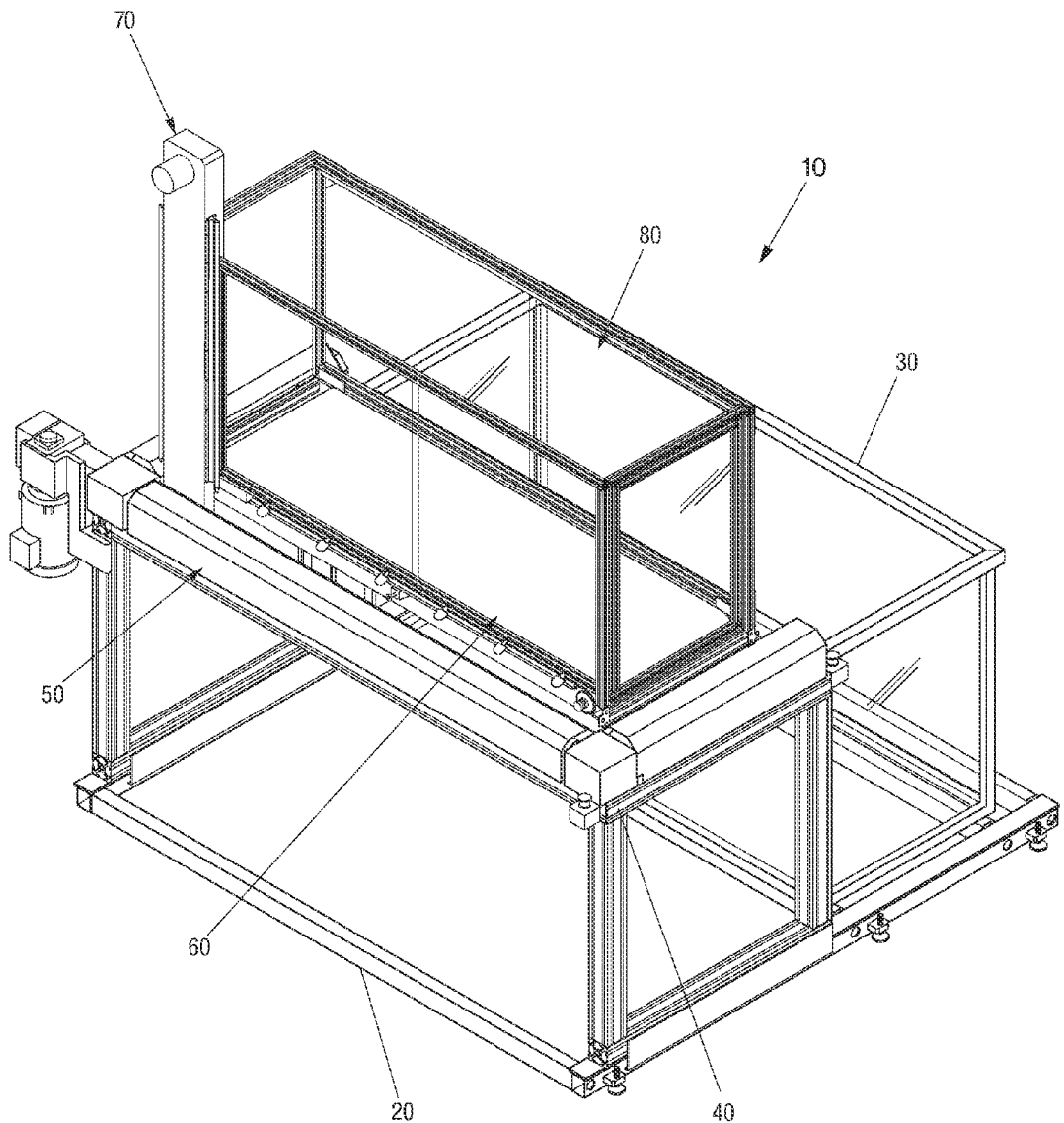
FIG. 2 is a left perspective view of the multi-functional treadmill system of FIG. 1 with the treadmill assembly in a fully raised position.
Figure 3:
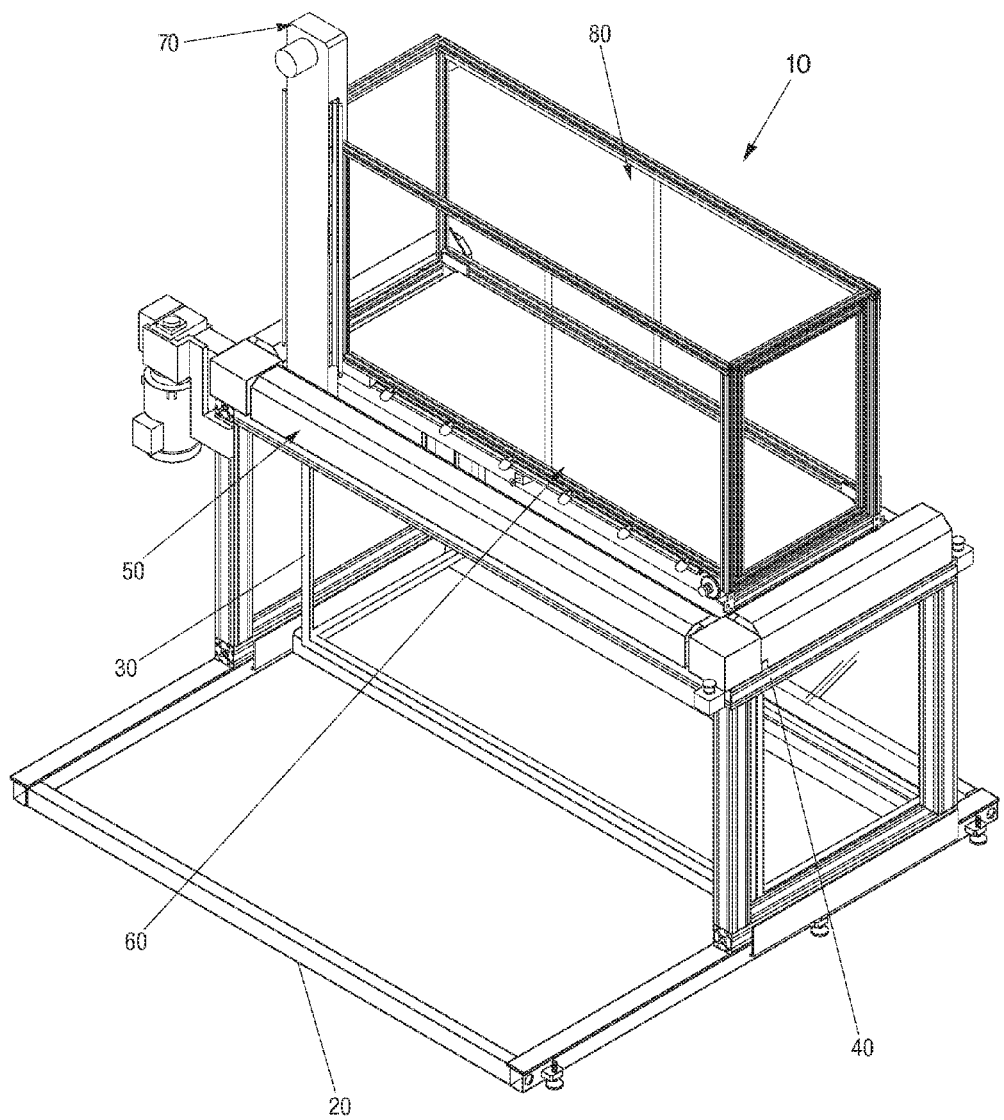
FIG. 3 is a left perspective view of the multi-functional treadmill system of FIG. 1 with the treadmill assembly in a fully raised position located above an exterior of the liquid tank.
Figure 4:
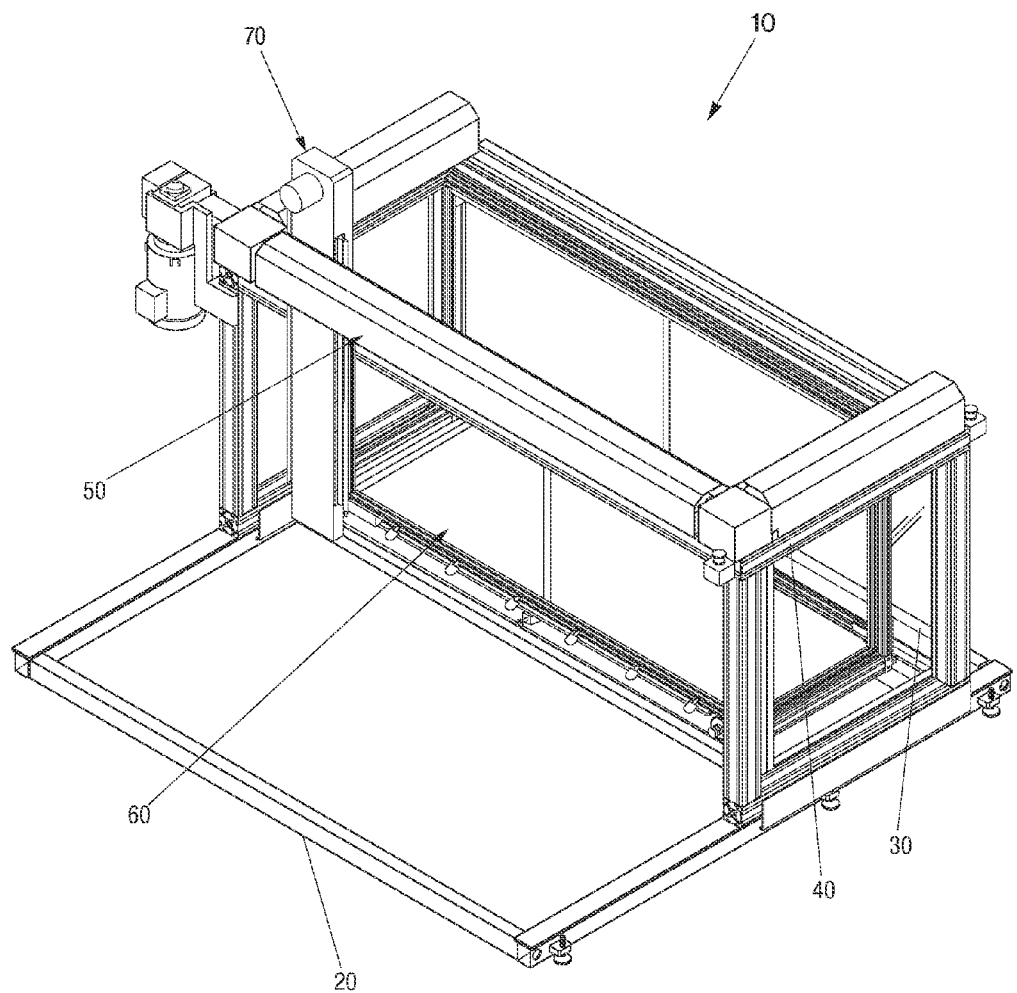
FIG. 4 is a left perspective view of the multi-functional treadmill system of FIG. 1 with the treadmill assembly in a fully lowered position located within an interior of the liquid tank.
Figure 5:
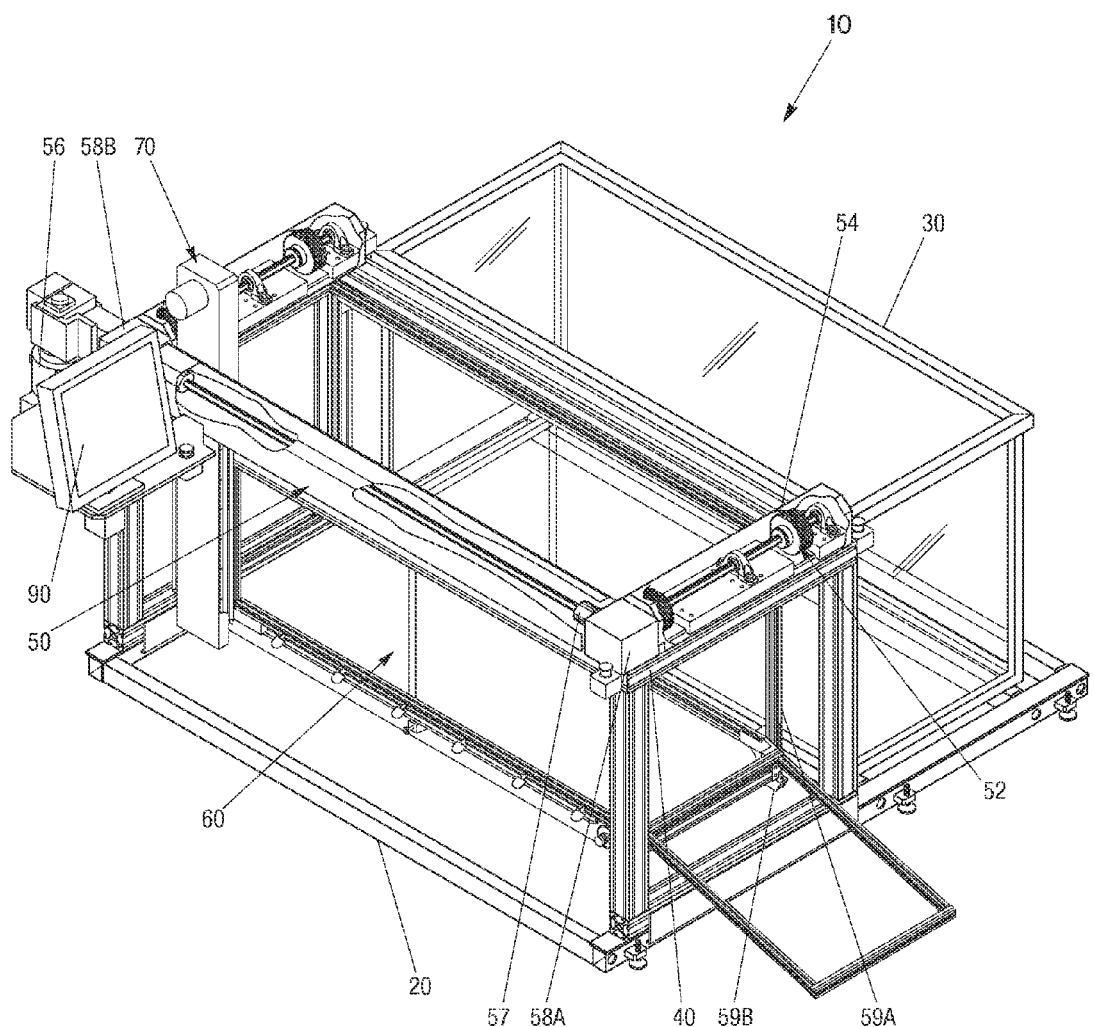
FIG. 5 is a left perspective view of the multi-functional treadmill system of FIG. 1 showing detail of the lifting mechanism.
Figure 6:
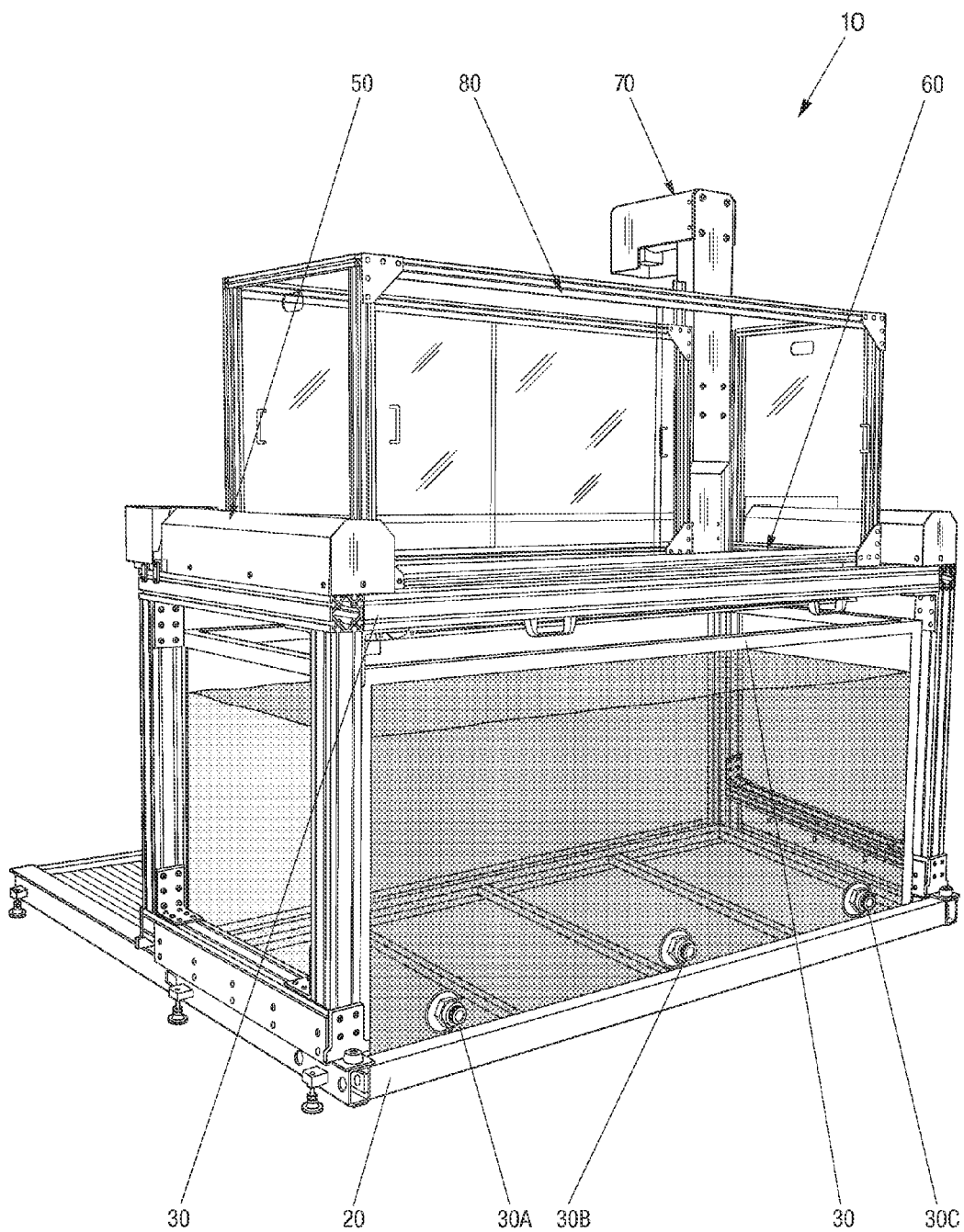
FIG. 6 is a right perspective view of the multi-functional treadmill system of FIG. 1.

Now referring to FIGS. 1-14, a preferred embodiment of the instant invention is illustrated and generally indicated. As will hereinafter be more fully described, the multi-functional treadmill system 10 generally includes a support platform 20, a liquid tank 30, a lift support structure 40 configured for slidable engagement with the support platform 20 along a horizontal axis, a lifting mechanism 50 attached to the lift support structure 40 for raising and lowering a treadmill assembly 60 into the liquid tank 30. In operation, the lift support structure 40 slidably moves horizontally along the support platform 20 to position the treadmill assembly 60 above the liquid tank 30 and, subsequently, the lifting mechanism 50 lowers the treadmill assembly 60 into an interior of the liquid tank 20.

The present invention provides a multi-functional and upgradable multi-functional treadmill system 10 having modularity, ease-of-use, ease of cleaning and maintenance, hot-swapping of parts at time of repair, and the ability to upgrade to a full hydrotherapy treatment system (combination of treadmill and lap pool). In addition, the multi-functional treadmill system 10 provides the flexibility of providing physical therapy simultaneously to more than one mammal at a time. Also, the multi-functional treadmill system 10 reduces the expense, effort, and space required to maintain and operate the multi-functional treadmill system 10 for therapy in water and outside of the water.

Referring to FIGS. 1-5, the present invention includes a support platform 20, a liquid tank 30, and a lift support structure 40 connected to the treadmill assembly 60 by a lifting mechanism 50. In general, the liquid tank 30 and the lift support structure 40 including the treadmill assembly 60 move horizontally relative to and independent of one another along the support platform 20 to position the lift support structure 40 away from or about the liquid tank 30. In addition, the treadmill assembly 60 moves vertically relative to and independent of the lift support structure 40 using the lifting mechanism 50 to lower or raise the treadmill assembly 60 within an interior of the liquid tank 30 or exterior of the liquid tank 30. More importantly, the combination of the horizontal movement and the vertical movement of the treadmill assembly 60 permits a mammal to step onto the treadmill assembly 60 before the treadmill assembly 60 is raised and then lowered into an interior of the liquid tank 30.

The support platform 20 may be attached, permanently or temporarily, to a floor or other horizontal plane for support. The multi-functional treadmill system 10 includes a support platform 20 having at least two side rail members positioned along a horizontal axis. In another embodiment, the support platform 20 includes four rails positioned on a horizontal plane. The four rails including two side support rails, a top support rail and a bottom support rail. The two side support rails are configured to facilitate slidably engaging the lift support structure 40. It should be noted that the support platform 20 may include less than or greater than four rails to facilitate slidable engagement with the lift support structure 40.

The multi-functional treadmill system 10 includes the liquid tank 30 positioned near the support platform 20. In one embodiment, the liquid tank 30 is positioned within an interior defined by the support platform 20. The liquid tank 30 positioned on six high density plastic feet which rest on a floor within the interior. It should be noted that less than or more than six plastic feet may be used. Alternatively, the liquid tank 30 may be positioned on the floor within the interior defined by the support platform 20. The outer dimension of the liquid tank 30 may track or be similar to the outer dimension of the support platform 20. In one embodiment, the outer dimension of the liquid tank 30 may be substantially less than the outer dimension of the support platform 20. The liquid tank 30 or storage container may consist of a commercial grade aquarium glass, Plexiglas, or other material tank known in the art for making liquid tanks. Most importantly, the liquid tank 30 has a top end which is open to allow a treadmill to be lowered into the interior of the liquid tank 30. Alternatively, the liquid tank 30 may include a swimming pool or lap pool or any other type of tank or storage container which can hold liquids, such as water or other desired liquids for physical or hydrotherapy. Of course, the liquid tank 30 may be adjusted for size, shape, thickness of material, dimension, and other factors which can facilitate the raising and lowering of a treadmill into the interior of the liquid tank 30. In one embodiment, the liquid tank 30 includes apertures which are temporarily plugged along a side wall of the liquid tank using plugs 30A-C, or sump fittings, disposed within the apertures of the liquid tank wall. Upon removal of the plugs, the water will drain out of the liquid tank 30.

Figure 14:
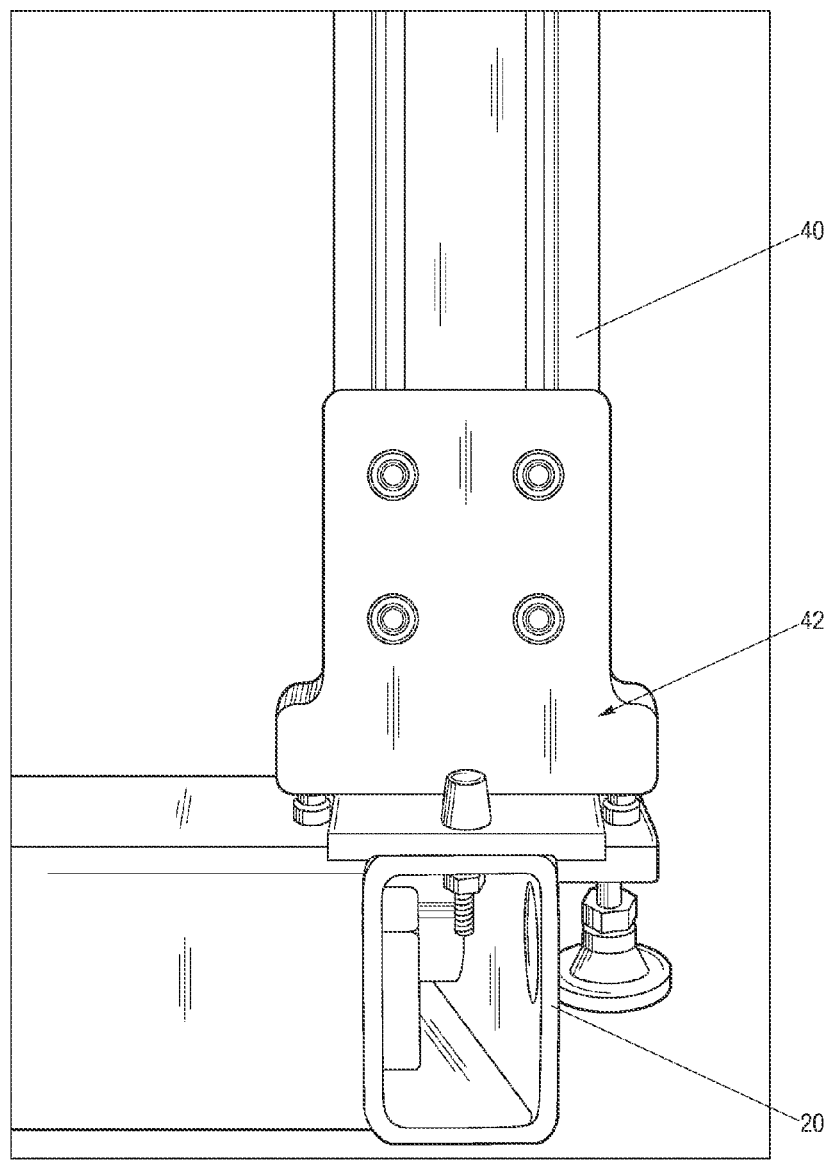
FIG. 14 is an isolated view of the sliding mechanism for engaging the lift support structure to the support platform.

The multi-functional treadmill system 10 includes the lift support structure 40 configured for slidably engaging with the support platform 20 along a horizontal axis. The lift support structure 40 includes a sliding mechanism 42 (FIG. 14) attached at a lower portion of the lift support structure 40 and configured for slidable engagement with said at least two side rail members of the support platform 20 for independent movement of the lift support structure 40 along a horizontal axis relative to the liquid tank 30. The sliding mechanism 42, in one embodiment, is illustrated at FIG. 14. Typically, at least four or more of these sliding mechanisms are installed on the lower portion of the lift support structure 40 whereby at least two are positioned on either side where the lift support structure 40 and the support platform 20 engage one another. More specifically, each sliding mechanism 42 has two cylindrical bearings which roll on the opposite sides of the short side of each support platform rail member. The bearings function to limit the motion of the lift support structure 40 on the support platform 20 to one plane.

In one embodiment, the lift support structure 40 defines a rectangular box with lower rails for slidably engaging with the side rails of the support platform 20. A horizontal movement assembly may also provide the sufficient force to move the lift support structure 40 relative to the support platform 20. It should be noted that other means known in the art for moving the lift support structure 40 relative to the support platform 20, such as manual operation, may be used. At least one pull handle is attached to an upper portion of the lift support structure to facilitate horizontal movement of the lift support structure 40 along the support platform 20 relative to the liquid tank 30. In one embodiment, the horizontal movement assembly may include a motor unit to provide the sufficient force for moving the lift support structure 40. Note, the support platform 20 and the lift support structure 40 may be made of stainless steel, metal, or other suitable materials.

Figure 10:
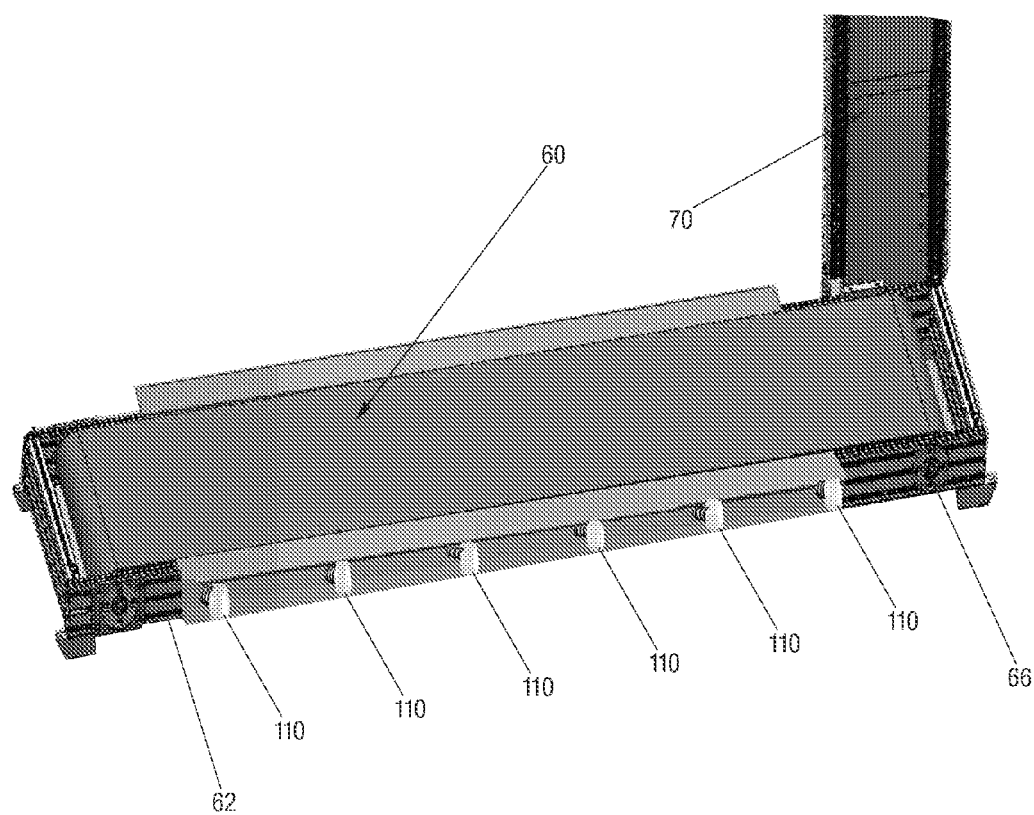
FIG. 10 is a side view of the treadmill assembly of FIG. 9 without a liquid tank.
Figure 11:
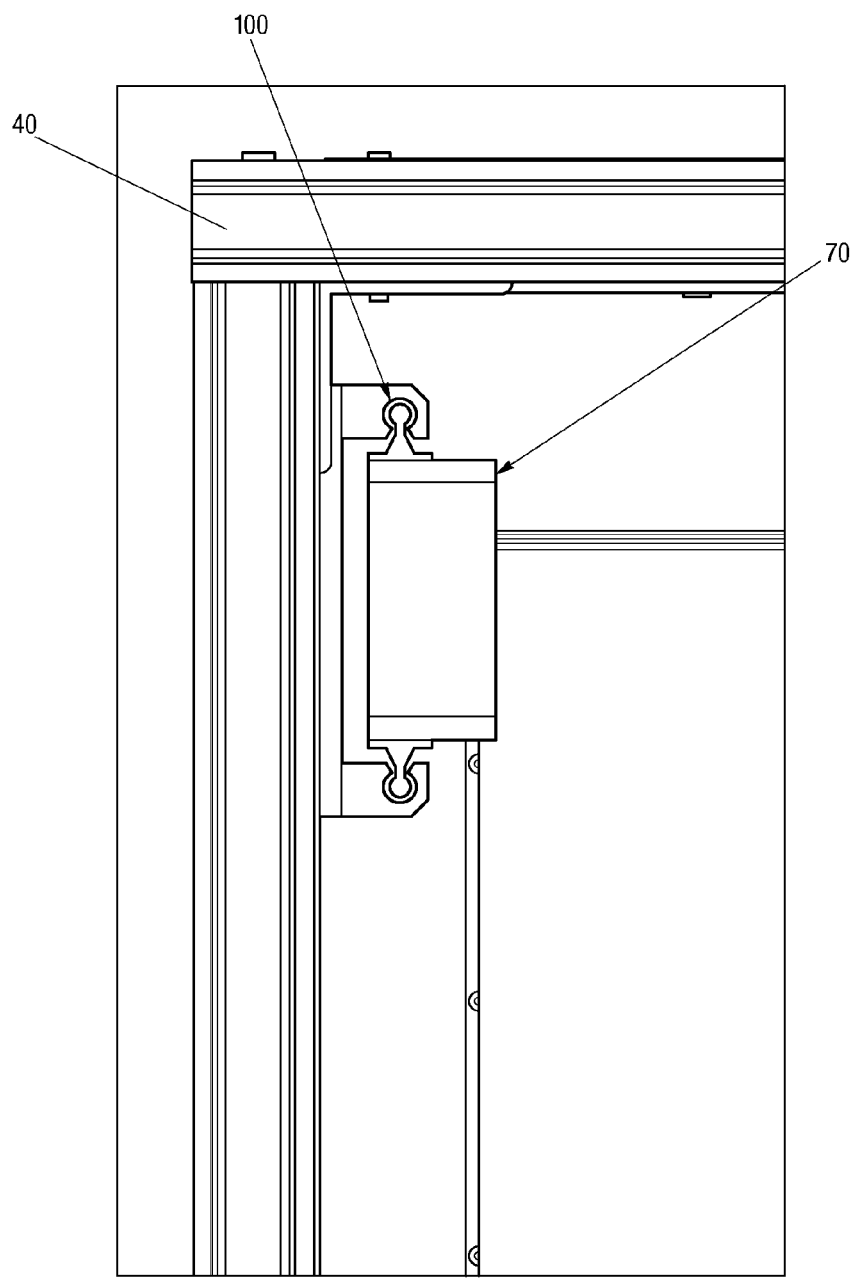
FIG. 11 is an isolated top view of the stabilizer bar assembly of FIG. 9.
Figure 12:
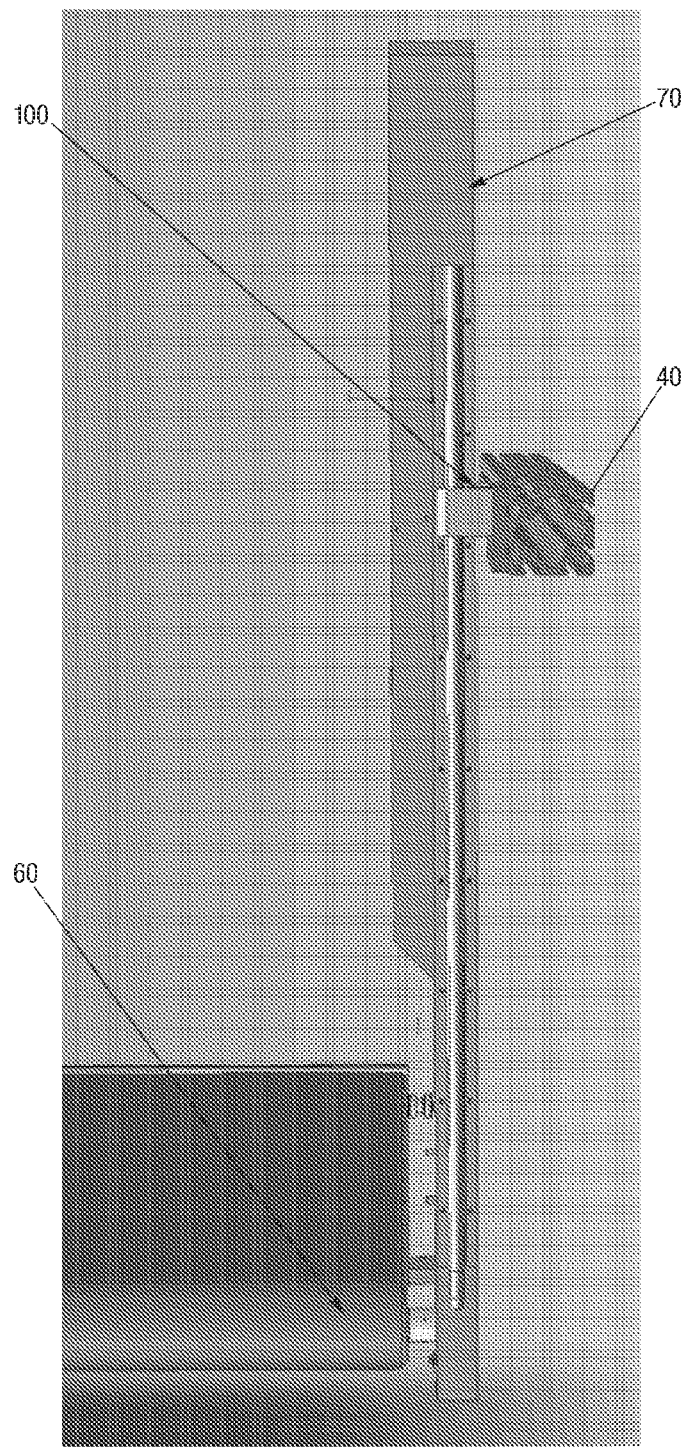
FIG. 12 is an isolated cross-sectional view of the stabilizer bar assembly of FIG. 9.
Figure 13:
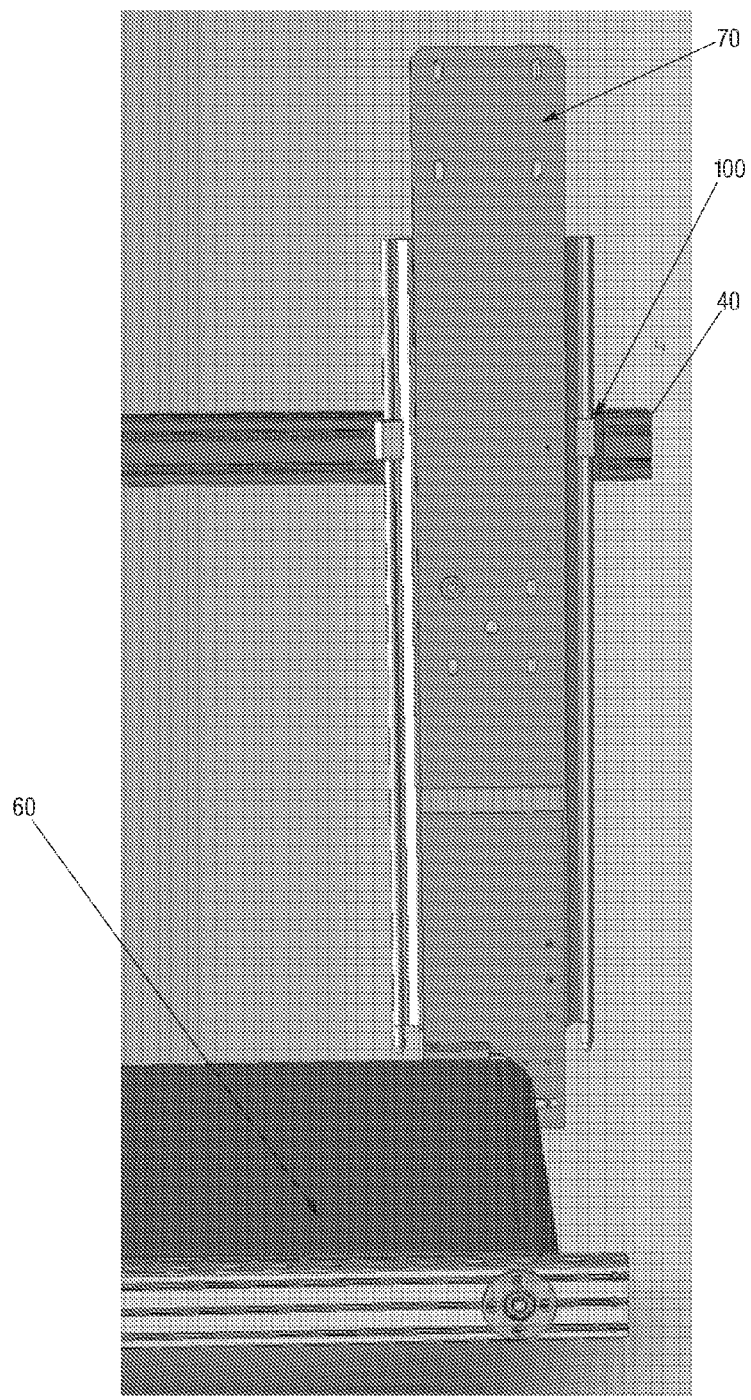
FIG. 13 is an isolated side view of the stabilizer bar assembly of FIGS. 9.

The treadmill assembly 60 is operationally connected to the lifting mechanism 50 to provide vertical raising and lowering of the treadmill assembly 60 by the lifting mechanism 50 attached to the lift support structure 40 for positioning the treadmill assembly 60 within the liquid tank 30 independent of the lift support structure 40. The treadmill assembly 60 is operationally connected to the lifting mechanism 50 for movement along a vertical axis. Referring to FIG. 10, the treadmill assembly 60 includes a treadmill support structure or base 62, and a treadmill including a conveyor belt 64 connected to the base 62, and a roller assembly 66 connected to the conveyor belt 64, attached or connected to base 62.

At one end of the lifting mechanism 50, it is attached to the lift support structure 40 for raising and lowering the treadmill assembly 60 into the liquid tank 30. The lifting mechanism 50 is attached at an upper end of the lift support structure 40 which has a height sufficient to clear an upper end of the liquid tank 30. At another end of the lifting mechanism 50, it is connected to the treadmill support structure or base 62. The lifting mechanism 50 includes at least one winching assembly 52 including at least one winching wheel 54, a motor 56 connected to the at least one winching assembly 52 using a drive shaft 57, a series of gear boxes 58A, 58B connected to the motor 56, winching assembly 52, and the drive shaft 57, and a wire member 59A connecting to the at least one winching wheel 54 of the winching assembly 52 to a wire connector member 59B attached to the base 62 of the treadmill assembly 60. In operation, the winching wheel turns and thereby rolling up the wire member 59A attached to the base 62 which accordingly moves the treadmill assembly upwardly or downwardly in accordance with a user's preference. Note, the motor 56 may be positioned outside of the liquid tank 30 to keep the motor dry and facilitate ease of repair/replacement. It should be noted that other means may be used known in the art for moving the treadmill assembly 60 along a vertical axis, such as manual operation.

The treadmill support structure may include Plexiglas guards 80. The guard 80 extends about a periphery of a base of the treadmill assembly 60 and attached to an upper surface of the treadmill assembly 60 to contain mammal or user of treadmill during operation. The guard 80 includes a series of slidably moving doors with handles which can be easily removed or attached to the treadmill assembly 60. A door member 82 is hingedly connected to the treadmill assembly 60 for engagement with open end of the guard 80 to permit mammal or user to engage treadmill assembly 60. During entry to and exit from the tank, the mammal or user is protected by removable Plexiglas guards 80 which insert into the treadmill support structure or base. The long sides have sliding windows, allowing therapists and family members to assure the mammal or user. The presence of Plexiglas guards 80 on all sides may not be necessary for many mammals after their first introduction to the liquid tank, therefore one or more of these guards 80 may be removed at any time. The short sides have hinges and locks, allowing them to serve as a ramp as well as a door. Mammals or user may enter through one door and exit through the other. The doors are also removable. If a therapist wishes to control the legs of a large dog during a therapy session, narrow seating platforms will be present on the short sides of the lift support structure 40. The Plexiglas guard 80 on either end of the treadmill support structure or base can be easily, removed, allowing the therapist to sit while working with the dog. Small mammals or canines may also be easily managed with the therapist standing outside of the liquid tank 30.

Figure 8:
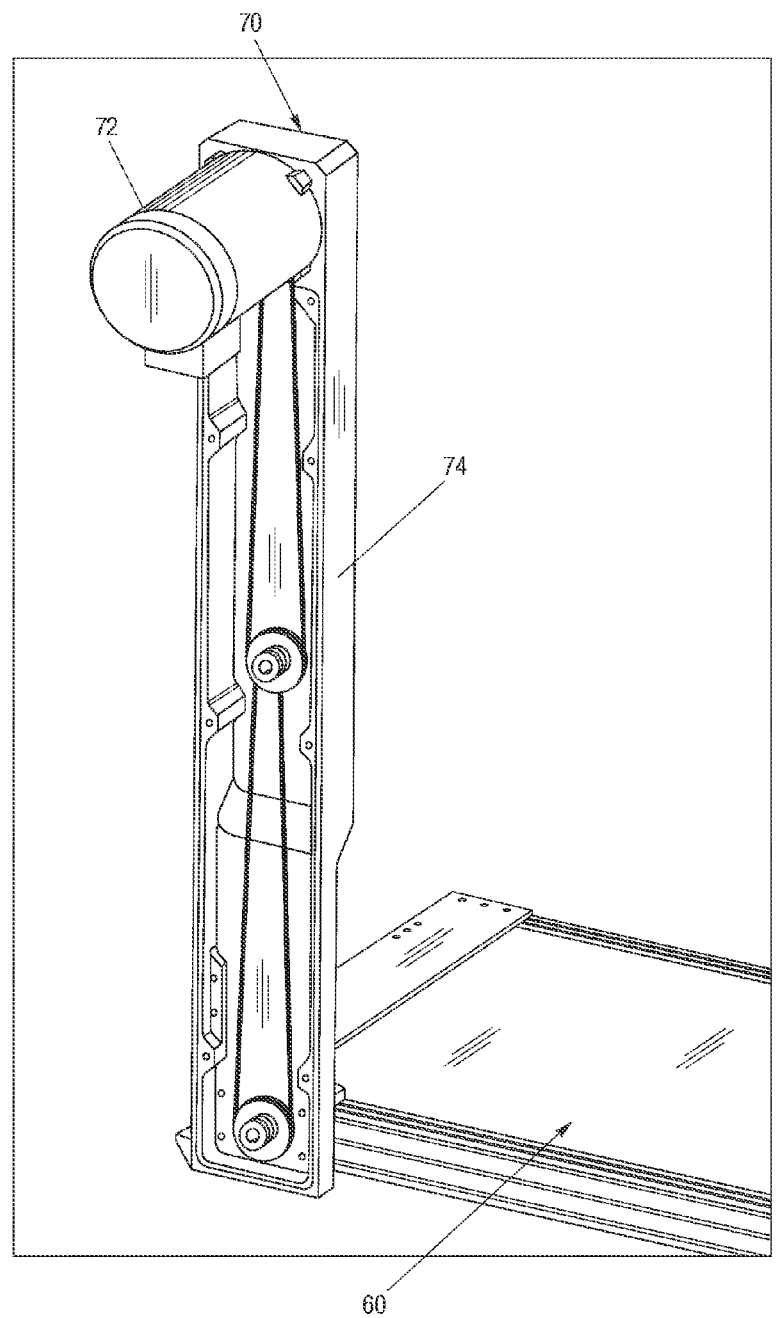
FIG. 8 is an isolated side view of a pulley assembly connected to the treadmill of the present invention.

Referring to FIG. 8, the treadmill assembly 60 is operationally connected to a pulley assembly 70 for driving a conveyor belt of the treadmill assembly 60. The pulley assembly includes a housing 74, a pulley motor 72 to provide power, and a series of belts connected to the pulley motor 72 and the roller assembly of the treadmill assembly 60 for driving the conveyor belt. Alternatively, the series of belts and pulleys may be replaced with a stainless steel shaft, a gear speed reducer, and a right angle gearbox. The pulley motor 72 of the pulley assembly positioned upwardly from and attached to the base 62 of the treadmill assembly 60 and extending to a height approximately greater than the height of the liquid tank 30. The motor unit 72 may be positioned on a vertical arm housing 74 which extends above the liquid tank 30. The motor unit 72, in one embodiment, may be connected to a gear box. The extended height of the pulley motor 72 relative to the treadmill assembly 60 prevents the pulley motor from being inserted into interior of the liquid tank 30.

One of the key advantages of the multi-functional treadmill system 10 is its modularity. The system is divided into multiple modular assemblies for easy access to parts. The capability of completely separating the lift support structure 40, support platform 20, and treadmill assembly 60 from the liquid tank 30 provides for significant ease of cleaning, maintenance and repair. As a result, parts such as motors, controllers, and water management equipment that require removal for periodic maintenance or repair may be readily removed manually or with tools found in a home-owner's toolbox. In addition, users will have the option of hot-swapping parts which reduces down-time significantly.

The modularity built into this multi-functional system 10 allows a custom system by replacing the aquarium glass tank, or liquid tank 30, with a lap or swimming pool. In this case, an above-ground lap pool of appropriate width to fit within the dimensions of the support platform 20 will replace the aquarium glass tank. This custom system is a space and money saver. In addition, the custom system comes with an added ergonomic benefit in that the treadmill system can double as a lift for dogs entering and leaving the pool.

Figure 7:
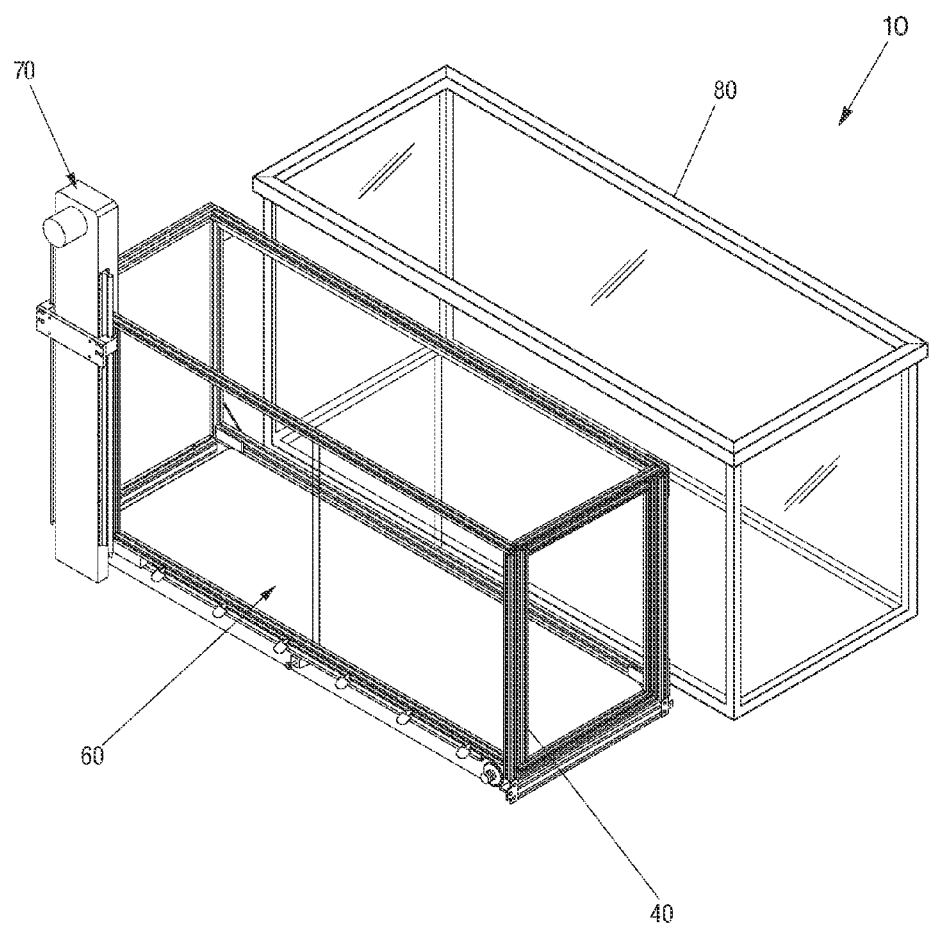
FIG. 7 is a perspective view of the multi-functional treadmill system of FIG. 1 without the support platform.

More importantly, referring to FIG. 7, the multi-functional treadmill system 10 is flexible and can accommodate more than one type of therapy and more than one mammal or dog. When the liquid tank 30 is separated from the lift support structure 40 and treadmill assembly 60, it is possible to treat two dogs simultaneously. For example, one dog can walk on the dry treadmill assembly 60 outside of the tank while another dog can swim in the liquid tank 30.

The multi-functional treadmill system 10 may also include additional elements. For example, the entire treadmill system may be operated by a touch screen and/or a computer system 90. The treadmill assembly 60, lifting mechanism 50, and horizontal moving assembly may include controllers. These controllers may, in turn, interface with a CPU or central processing unit of a computer system. The computer system 90, which includes a monitor or touch screen can then control the operation of the treadmill assembly 60, lifting mechanism 50, and horizontal moving assembly In an alternative embodiment, a control center including a CPU is operationally connected to the lifting mechanism 50 for vertical control of the treadmill assembly 60, means for cleaning water of the liquid tank 30, the treadmill assembly 60, and a means for moving the lift support structure 40 along a horizontal axis independent of the liquid tank 30.

Also, for purpose of water management, the system may include a filter, water pump, heater, ultraviolet purifier, bag filter, and starter chemicals. In addition, the system includes out-of-water motors to operate the lifting mechanism 50, treadmill assembly 60, or the horizontal movement assembly. The out-of-water motor does not interfere with the therapists' work space. The benefits of an out-of-water motor are two-fold; it costs less and it lasts longer.

To provide stability to the treadmill assembly 60, referring to FIGS. 9, 11-13, at least one stabilizer bar assembly 100 is provided. The at least one stabilizer bar assembly 100 is attached to the housing 74 of the pulley assembly 70 and to the outer periphery of the treadmill assembly 60 to provide stability during movement. In one embodiment, the stabilizer bar assembly 100 comprises two Thomson® shafts attached to the housing 74 for the pulley assembly 70 and a stabilizer frame attached to the lift support structure 40. The stabilizer frame defines two sleeves with ball bearings inside to allow the Thomson® shafts to slide freely therein as the treadmill assembly 60 is raised and lowered. This stabilizer bar assembly 100 stabilizes the treadmill assembly 60 both in and out of the liquid tank 30. In operation, the stabilizer frame remains in one position, attached to the lift support structure 40. The two Thomson® shafts move upwardly and downwardly with the housing 74 and slidably engage within the two sleeves of the stabilizer frame.

Figure 9:
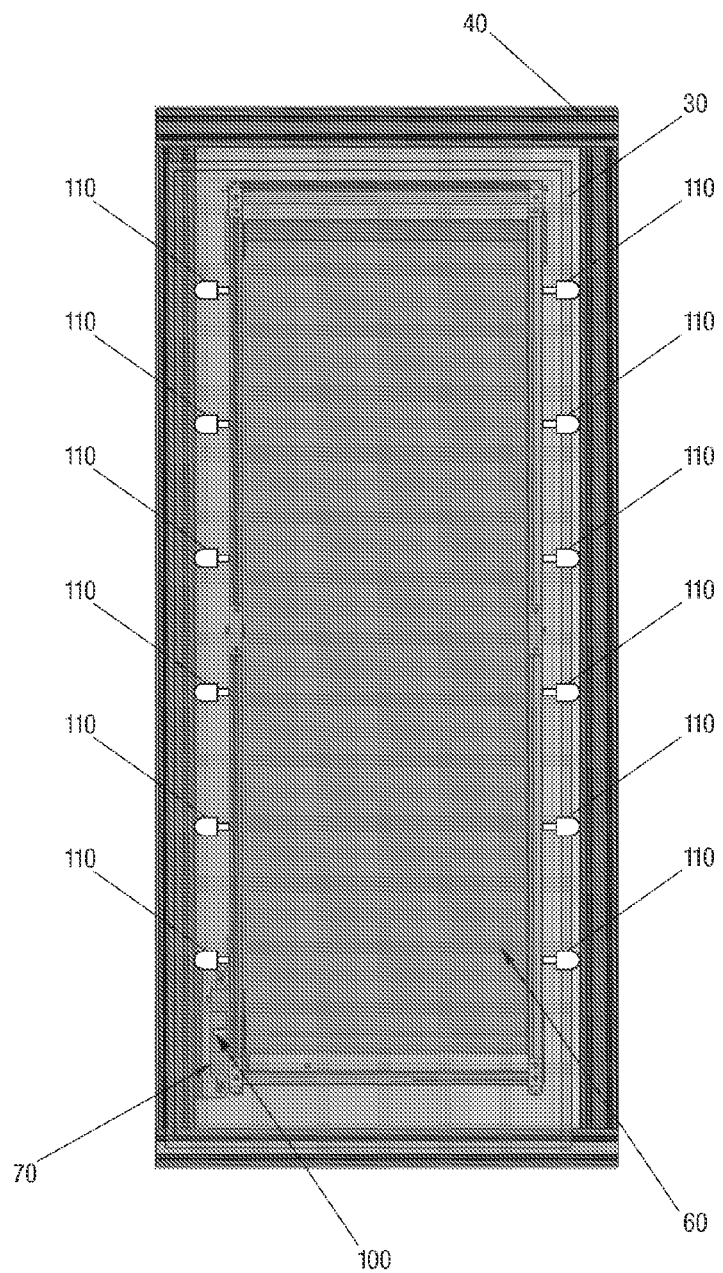
FIG. 9 is a top view of the present invention of FIG. 3 including spring-bias members and a vertical stabilizer bar assembly for stabilizing treadmill assembly.

To provide further stability to the treadmill assembly 60, referring to FIGS. 9 and 10, the at least one spring-biased member 110, or skid guards, are attached to an outer periphery of the base of the treadmill assembly 60 for engaging the treadmill assembly 60 and the liquid tank 30 to stabilize the treadmill assembly 60 during movement within the liquid tank 30. In one embodiment, at least one spring-biased member 110 is attached along long sides of the treadmill base. Note, the spring-biased members 110 are positioned to allow the treadmill assembly 60 to clear the plugs, or sump fittings, disposed within the apertures of the liquid tank 30 wall to prevent the unexpected draining of the water out of the liquid tank 30. The spring-biased members 110 are attached to the treadmill base using a spring-loaded mechanism, such as a spring, and extended slightly beyond an outer edge of the treadmill base insuring that the spring-biased member engages the sidewalls of the liquid tank 30. In one embodiment, the spring-biased members 110 are made of Ultra High Molecular Weight (UHMW) plastic or other cushioning material. In an alternative embodiment, rubber wheels may be attached to the treadmill base instead of the UHMW plastic or other cushioning material. It should be noted that the spring-biased member 110 may function without the spring-loaded mechanism to rely on the cushioning material to lessen the impact of contact between the treadmill assembly 60 and the sidewalls of the liquid tank 30. In addition, a configuration of the spring-biased member 110 allows for the inclusion of removable therapist foot rests and a therapist seat which will be attached to the treadmill base and slidably move or glide along the length of the treadmill as needed by the therapist to treat the mammal or user.

In operation, in general, the lifting mechanism 50 raises the treadmill assembly 60 above the liquid tank 30, the lift support structure 40 moves horizontally independent of and relative to the liquid tank 30 along the support platform 20 for positioning about the liquid tank 30, and the lifting mechanism 50 lowers the treadmill assembly 60 into an interior of the liquid tank 30 independent of and relative to the lift support structure 40.

In operation, more specifically, the treadmill assembly 60 is raised to a height above the liquid tank 30 by the lifting mechanism 50, the lift support structure 40 is then glided away from the liquid tank 30. Second, the treadmill assembly 60 is lowered to a floor or to the support platform 20 by the lifting mechanism 50, allowing for the entry of the mammal or user onto the treadmill assembly 60 at a floor or support platform 20 level. The lifting mechanism 50 then lifts the treadmill assembly 60 to a height or level where it can clear the top end of the liquid tank 30, and subsequently the lift support structure 40 is glided back over the top end of the liquid tank 30.

The lifting mechanism 50 then lowers the treadmill assembly 60 and dog or mammal into the liquid tank 30 at the optimal level for treatment. The reverse steps are performed when the dog exits the liquid tank 30. In summary, the lift support structure 40 slidably moves along the support platform 20 to position the treadmill above the liquid tank 30 and, subsequently, the lifting mechanism 50 lowers the treadmill into an interior of the liquid tank 30.

In addition, the present invention provides a method for operating a multi-functional treadmill system 10 comprising the following steps. First, a support platform 20 is provided. Second, a liquid tank 30 is positioned within an interior defined by the support platform 20. Third, the treadmill assembly 60 is attached to a lift support structure 40 near the support platform 20 to allow the mammal or user to engage the treadmill assembly 60. Fourth, the treadmill assembly 60 is raised away from the support platform 20 towards a top portion of the lift support structure 40. Fifth, the lift support structure 40 slides along a horizontal axis independent of the liquid tank 30 while engaging the support platform 20 to position the treadmill assembly 60 above the liquid tank 30. Finally, the treadmill assembly 60 is lowered independent of the lift support structure 40 along a vertical axis to a position within an interior of the liquid tank 30.

Referring to FIGS. 1-14, it can be seen that the present invention provides a unique solution to the problem of providing a treadmill system. The treadmill system 10 provides a multi-functional and upgradable treadmill system having modularity, ease-of-use, ease of cleaning and maintenance, hot-swapping of parts at time of repair, and the ability to upgrade to a full hydrotherapy treatment system (combination of treadmill and lap pool). In addition, the multi-functional treadmill system 10 provides the flexibility of providing physical therapy simultaneously to more than one mammal at a time. Also, the multi-functional treadmill system 10 reduces the expense, effort, and space required to maintain and operate a treadmill system for therapy in water and outside of the water.

Therefore, while there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A treadmill system, comprising:
a support platform;
a liquid tank positioned within an interior area defined by the support platform;
a lift support structure configured for horizontal movement along the support platform relative to and independent of the liquid tank; and
a treadmill assembly vertically raised and lowered by a lifting mechanism attached to the lift support structure for positioning the treadmill assembly within the liquid tank independent of the lift support structure,
whereby the lifting mechanism raises the treadmill assembly above the liquid tank, the lift support structure moves horizontally independent of and relative to the liquid tank along the support platform for positioning about the liquid tank, and the lifting mechanism lowers the treadmill assembly into an interior of the liquid tank independent of and relative to the lift support structure.

2. A treadmill system, comprising:
a support platform including at least two side rail members positioned along a horizontal axis;
a liquid tank positioned within an interior defined by the support platform, said liquid tank positioned on one or more high density plastic feet which rest on a floor within the interior;
a lift support structure having a sliding mechanism attached at a lower portion of the lift support structure and configured for slidable engagement with said at least two side rail members for independent movement of the lift support structure along a horizontal axis relative to the liquid tank; and
a treadmill assembly operationally connected to a lifting mechanism to provide vertical raising and lowering of the treadmill assembly by the lifting mechanism attached to the lift support structure for positioning the treadmill assembly within the liquid tank independent of the lift support structure,
whereby the lifting mechanism raises the treadmill assembly above the liquid tank, the lift support structure moves horizontally independent of and relative to the liquid tank along the support platform for positioning about the liquid tank, and the lifting mechanism lowers the treadmill assembly into an interior of the liquid tank independent of and relative to the lift support structure.

3. The treadmill system of claim 2, further comprising:
a pulley motor assembly for driving a conveyor belt of the treadmill assembly extending upwardly from and attached to a base of said treadmill assembly to prevent motor assembly from being inserted into interior of the liquid tank.

4. he treadmill system of claim 2, further comprising:
a plastic guard extending about a periphery of the said treadmill assembly and attached to an upper surface of said treadmill assembly to contain user of treadmill during operation.

5. The treadmill system of claim 4, further comprising:
a door member hingedly connected to the treadmill assembly for engagement with open end of said plastic guard to permit user to engage treadmill assembly.

6. The treadmill system of claim 2, further comprising:
at least one pull handle attached to an upper portion of the life support structure to facilitate horizontal movement of the lift support structure along the support platform.

7. The treadmill system of claim 2, wherein the treadmill assembly comprises:
a base;
a conveyor belt connected to the base; and
a roller assembly connect to the conveyor belt.

8. he treadmill system of claim 3, wherein the pulley assembly comprises:
a housing
pulley motor; and
a series of belts connected to the pulley motor and a roller assembly of the treadmill assembly for driving the conveyor belt.

9. The treadmill system of claim 2, wherein the lifting mechanism comprises:
at least one winching assembly;
a motor connected to the at least one winching assembly using a drive shaft;
a series of gear boxes connected to the motor, said at least one winching assembly, and said drive shaft; and
a wire member connecting the at least one winching assembly to the base of the treadmill assembly.

10. The treadmill system of claim 2, further comprising:
a control center including a CPU operationally connected to said lifting mechanism for vertical control of the treadmill assembly, means for cleaning water of said liquid tank, said treadmill assembly, and a means for moving said lift support structure along a horizontal axis independent of the liquid tank.

11. The treadmill system of claim 2, wherein said guard includes a series of slidably moving doors with handles which can be easily removed or attached to the treadmill assembly.

12. The treadmill system of claim 2, further comprising:
at least one stabilizer bar assembly attached to a housing of the pulley assembly attached to the treadmill assembly and the lift support structure for stabilizing treadmill assembly.

13. The treadmill system of claim 9, further comprising:
at least one spring-biased member attached to the treadmill assembly for engaging the treadmill assembly and the liquid tank to stabilize the treadmill assembly.

14. The treadmill system of claim 2, wherein the liquid tank includes apertures which are temporarily plugged along a side wall of the liquid tank.

15. A method for operating a treadmill system, comprising:
providing a support platform;
providing a liquid tank positioned within an interior defined by the support platform;
positioning a treadmill assembly attached to a lift support structure near the support platform to allow user to engage treadmill assembly;
raising said treadmill assembly away from said support platform towards a top portion of the lift support structure;
sliding said lift support structure along a horizontal axis independent of the liquid tank while engaging said support platform to position said treadmill assembly above said liquid tank; and
lowering said treadmill assembly independent of the lift support structure along a vertical axis to a position within an interior of said liquid tank.

* * * * *